Patented Jan. 28, 1936

2,029,248

UNITED STATES PATENT OFFICE 2,029,248

PRESERVATION OF ANIMAL TISSUES

Sidney Musher, New York, N. Y.

No Drawing. Application July 16, 1935,
Serial No. 31,655

10 Claims. (Cl. 99—169)

This invention relates to the preservation of animal products against oxidative changes and more particularly is concerned with the protection of the fat in those products against oxidation, such oxidation being due primarily to the pro-oxygenic character of the non-fatty solids of such materials.

Deterioration of all animal products including meat, fish, and poultry due to the bacterial decomposition, growth of micro-organisms and mold upon their surfaces is well recognized. Salt has for many years been used to protect such products against undesirable bacterial change. They have been subjected to such treatment as salting, smoking, pickling, etc., wherein due to the protective action of the salt and other chemicals used in those special processes, bacterial changes are substantially inhibited. In the fish industry but a relatively small proportion is smoked or specially treated as most fish is merely kept under refrigeration or salted. Meat products with the exception of hams and bacon which are generally smoked for the most part are used in their original condition, being held under refrigeration until ready for consumption. Poultry is similarly kept in cold storage although for more limited periods of time.

Such protection as is, however, given by refrigeration, salt, or chemicals used in these processing methods deals with the protection of the non-fatty phase of those products. It is desirable, therefore, that the salt should penetrate into the interior of the animal tissues to replace the albuminous or other substances which are responsible for putrefactive decomposition, or that refrigeration maintain a temperature low enough to inhibit bacterial decomposition. Little attention has, however, been given to protecting the fatty phase of these animal tissues against oxidative changes, such changes resulting in loss of flavor, discoloration, and subsequent rancidity, all due to the breakdown of the fatty structures and not directly related to changes in the non-fatty solids of those products.

In the fish industry and particularly in the fatty fish, such as mackerel, white fish, halibut, etc., efforts to inhibit oxidation of the fat have been made by applying a glazing of ice or surface coating of paraffin in order to prevent the air from reaching the fish and in order particularly to prevent the air from reaching those blemishes on the fish which are responsible for more rapid oxidative changes than if the fish were free of blemishes. Even with such protection it has been impossible to properly protect fresh salted or frozen fish against oxidation of its fat and it therefore has been difficult to merchandise such products as frozen fillets, chilled mackerel, halibut, and other fish, whether cleaned or uncleaned and whether frozen, salted, or cured. Accordingly, the problem of oxidative changes of the fat contained in animal products has not been solved and this problem is a serious one to these industries.

Nature has drawn a sharp line of distinction between animal and vegetable products which this invention makes known. Whereas during the existence of life in all animate beings fatty decomposition does not occur except under certain pathologic conditions, yet immediately upon death the non-fatty solids of those products become strongly pro-oxygenic and produce rapid deterioration of the fatty structures distributed through the animal body. The normal metabolic processes of living beings hold that pro-oxygenic activity in check but as death occurs a process of fatty catabolism becomes normal. If the animal is to be rendered for its fat, such rendering must therefore take place immediately following death and the fat must be filtered with extreme care as otherwise it will quickly deteriorate and turn rancid due to contact with the pro-oxygenic non-fatty solids of that animal. The fat rendered from bacon will remain sweet and free of rancidity for from two to three times longer than bacon itself; mackerel and whale oil will keep substantially longer than the tissues of mackerel and whale containing the normal fat content; powdered cream containing 60% butter fat and 40% of the non-fatty solids of milk will keep twice as long as powdered whole milk containing 28% butter fat and 72% of the non-fatty solids of milk, etc.

In the vegetable kingdom, as in the animal kingdom, fatty decomposition does not occur during the growth and so-called life of those products. Upon the cessation of growth, however, vegetative materials become diametrically opposite to non-living animal products insofar as fatty decomposition is concerned.

So long as a vegetative material is in its original condition, fatty deterioration is rare. Effect a change in that condition, however, and fatty deterioration becomes normal. The non-fatty solids of vegetative products are strongly antioxygenic in character so that only when the fat normally contained in those products is in contact with their antioxygenic non-fatty solids will fatty decomposition be inhibited. Raw peanuts will keep free from rancidity many times longer than peanut oil pressed from those peanuts; soya flour turns rancid with difficulty but soya oil is prone to rancidity; cereals as corn, wheat and oats have been known to keep for years and may possibly keep for centuries without fatty decomposition but corn oil, wheat germ oil and oat oil are all very susceptible to oxidative rancidity and will under similar conditions keep only several months.

Among the objects of the present invention is the utilization of the antioxygenic non-fatty solids of vegetative products to offset the pro-oxygenic non-fatty solids of animal products.

Other objects include the protection of animal products against oxidative rancidity, loss of flavor, and discoloration by naturally occurring vegetative materials.

Other objects include relatively simple and inexpensive means to effectively accomplish these results.

Still further objects and advantages of the present invention will appear from the more detailed description given below, it being understood, however, that this more detailed description is given by way of illustration and explanation only, and not by way of limitation since various changes therein may be made by those skilled in the art without departing from the scope and spirit of the present invention.

In specifications, Serial No. 698,543, 710,727 and 799 filed November 17, 1933, February 10, 1934, and January 7, 1935 respectively there is particularly described and claimed the utilization of the vegetative materials including both oil-containing and non-oil containing substances, extracts derived from them and products obtained from them for the protection of other products against oxidative or ageing changes.

In specification, Serial No. 3,876 filed January 28, 1935, entitled Prevention of oxidation, there is described and claimed the protection of solid materials against oxidative changes by the application to their surfaces of antioxidative substances. In that application there is claimed the utilization of various vegetative materials in protecting the solids of food products against deterioration by oxidation or ageing changes. Antioxidant materials including vegetative matter such as the oil containing seeds, nuts, or fruits, or extracts or other products derived from them and the substantially non-oil containing vegetative materials such as cereals and grains or extracts or other products derived from them may be used for the protection of various types of solid products such as nuts, coffee, potato chips, oat flakes, cheeses, milk powders, cereals, etc.

As an instance for the carrying out of this invention, decorticated oat flour may be dusted upon sliced bacon to the extent of .5% in order to obtain a thin covering upon the surface of that bacon. A sample of bacon treated in that manner was found to last 45 days under refrigeration without turning rancid whereas the untreated bacon turned rancid within 24 days. Similarly, oat flour may be dusted upon fat backs, chilled beef, tenderloin, and other meat products, the fat of which is subject to rapid oxidative changes causing quick loss of flavor, discoloration and rancidity.

In place of dusting oat flour over its surface, the meat product may be immersed in a solution containing oat flour as in a mixture of 30% oat flour and 70% water thereby obtaining surface covering or it may be boiled in that mixture. The oat flour may be mixed with the other ingredients used for pickling or curing and the combination coated upon the surface or injected into the inner parts of the meat product. The method of injecting the antioxidant is not as satisfactory as surface coverage since it is important to concentrate the antioxidant upon the surface of the product rather than impregnating it through the mass. The oat flour may be mixed with its own weight of paraffin and the combination used to coat over the surface of the product, the paraffin acting to protect it against air and moisture penetration, the oat flour to inhibit any oxidative changes which would occur by reason of the inherent nature of the non-fatty solids of that meat product. It should be noted that while dusting of the products in accordance with the present invention reduces the tendency toward undesirable oxidative change or development of rancidity, that the effects of these materials is not merely an exclusion of air. While undoubtedly the coatings or dustings of the present invention do exclude the air to some extent from the substances, and to that extent are desirably employed, actually the antioxidation is a result of the inhibitive substances derived from the vegetative materials.

In the fish industry any one of several methods may be satisfactorily employed. Where the fish is salted the salt may be mixed with its own weight of the cheapest grade of crushed oats such as whole pulverized oats coating the surface of the fish with that mixture, the salt protecting the water phase and the whole pulverized oats protecting the fatty phase. If the fish is to be glazed with either a thin film of ice or with paraffin, the fish may either be dusted with oat flour before the icing or paraffining operation or a mixture of 50% oat flour and 50% water for icing or paraffin may be made in order to serve for the glazing. For such products as fillets, oat flour may be dusted on the fish to the extent of .25%, the operation to be carried out just as in the case of the dusting over bacon. Where the fish is cleaned before refrigeration, a more liberal quantity of oat flour is required since there is exposed a larger area of the raw surfaces which will more rapidly induce fatty oxidation. The fish should preferably not be washed to remove the oat flour until immediately before consumption. For such products as fillets dusted with oat flour and where the fish was thoroughly cleaned at point of origin, rinsing will not be necessary as the oat flour will in no way add a foreign flavor. Where the percentage used is sufficiently low, it will be found that after 3 or 4 days under refrigeration the oat flour will be well absorbed into the surface of the animal product so that no discoloration takes place.

Poultry may similarly be protected by this means. Particularly fatty chickens, geese, turkeys, etc., should be dusted liberally with a product such as oat flour in order to inhibit any oxidative changes during storage.

Any product of animal origin is included under this process. Other types of animal products are frogs' legs, oxtails, clams, crabmeat, eggs, including yolks and egg albumin, powdered whole milk, butter, frozen cream, fatty glandular extracts, lanoline, cheese, pork, and mutton. For instance, frozen cream may be dusted liberally with oat flour or it may be mixed with from .2% to 5% of oat flour; powdered egg yolk may be mixed mechanically with 5% of oat flour; powdered whole milk may be mixed with from 2% to 10% of oat flour. In protecting powdered egg yolk, powdered egg albumin, powdered whole milk, powdered buttermilk, etc., any of these powdered products may be treated by mixing of the powdered products with the antioxidant materials, or the protective substances may be incorporated with the egg yolk, the milk, etc., before the powdering or spraying operations are employed in producing such materials, so that the final product in powdered or sprayed condition will carry the antioxidants. While the milk-containing products have thus been referred to as capable of treatment in accordance with the present invention, the non-milk containing products like meat, fish, poultry, etc., particularly lend themselves to treatment by the coating or surface coverage in accordance with the present invention.

It has been found that a wide variety of antioxidants obtained from vegetative materials may be employed to protect animal products against fatty deterioration occurring by reason of oxidation. Protection for such products as meat and fish can preferably be given by protecting the outer surfaces. It is, therefore, desirable that solid form of antioxidant be coated or dusted upon the surface of the meat or fish to be protected, it being a matter of questionable importance as to whether or not such antioxidant is actually absorbed into the product. In most instances it is preferable that a non-soluble form of antioxidant be used so that it will remain upon the surface of the animal product without absorption in order that the exposed surface may constantly be protected from oxidative changes. If the antioxidant is too rapidly absorbed into the body of the animal product, the surface most subject to oxidative change is left exposed without proper concentration of the antioxidant at that surface.

It is preferable to use such naturally occurring vegetative materials or extracts thereof or products derived from them as have been more fully described in my co-pending applications for the purpose of protecting animal products against oxidation since by the utilization of these materials the cheapest form of antioxidant materials is employed and those which will be fully acceptable to government food regulations in all parts of the world. Such products as whole pulverized oats, oat flour, oat hulls, barley, hominy, soya flour, peanut press cake, linseed press cake, sunflower seeds, crushed sesame seed, roasted crushed peanuts, crude vegetable oils containing natural antioxidants derived from the non-fatty solids of the oil bearing seed, nut, or fruit or the organic or other solvent extracts of any of them or of any product derived from them may be satisfactorily employed. The sources of the antioxidant material particularly utilized in accordance with the present invention, therefore, may be looked upon from two general groups: first, the oil-containing seeds, nuts and fruits, and second, the non-oil containing vegetative materials, particularly including the cereals and grains, the flours made from such cereals and grains, grasses, the barks of certain trees, etc. Since many of the cereals and grains like oats can be utilized in accordance with present invention without seriously affecting the flavor or other taste characteristics of edible products, they may very desirably be employed, and are preferred as against the oil-containing seeds, nuts and fruits, the latter usually contributing more directly to flavor and taste changes in the edible products than are the antioxidants when employed from the cereals and grains, for example. Where modification of flavor, taste, etc. is either considered of no moment, or is actually sought, the oil-containing seeds, nuts and fruits, particularly lend themselves for utilization, since the desired flavor, taste, etc. may be modified in accordance with the particular products utilized in lending antioxidant properties to the products undergoing treatment.

The present invention utilizing the vegetative substances as a source for antioxidant activity, including both the oil-containing seeds, nuts and fruits and the non-oil containing vegetative materials like the cereals and grains, offers a new source of fundamental character for the protection of animal products against development of rancidity. While in the prior art lecithin has been suggested as utilizable in prevention of development of oxidative changes in certain products, lecithin in and of itself has been found by actual experimental work not to be the primary source of antioxidant activity; and even in those cases where impure lecithins have been employed, it is found that they are substantially inactivated at temperatures of about 150° F. and above, whereas in connection with the antioxidants employed by the present invention, these materials are effective antioxidants in general at temperatures considerably above 150° F. and running up into much higher temperatures. Furthermore the fact that the invention utilizes substances that are substantially free from lecithin shows that non-lecithin containing products are particularly employed by applicant in the protection of the materials against development of rancidity, and that the present invention is not dependent on the presence of lecithin, whether or not it may be present, for the results secured herein. Further, it may be noted that while carotene and carotinoid pigments have been suggested in the prior art as utilizable, actually today the art looks upon carotene as a pro-oxidant rather than an antioxidant. In any event, the materials with which applicant is concerned are not particularly carotene or carotinoid pigments and while some of these pigments might possibly be present in some of the materials employed in accordance with the present invention, the results secured by the present invention are not dependent upon the presence of carotene or carotinoid products, and most of the substances enumerated herein are entirely free from such materials, insofar as we are aware. The same considerations apply also to vitamins. While vitamin-containing substances have been indicated as utilizable in the prior art in the production of antioxidant compositions, the present invention makes use of materials which although they may contain vitamin substances are not dependent on those vitamins for protection against development of rancidity. This is well demonstrated by the fact that the present invention is particularly concerned with the utilization of many materials that are substantially free from vitamin substances in any substantial amount insofar as the art looks upon such materials today. So that non-vitamin containing substances may be utilized in accordance with the present invention, while securing very desirable results in protecting the materials, particularly edible products, against development of rancidity.

Just as oat flour is used, other antioxidants may be satisfactorily employed. It is possible to mix 3% of a phosphatide extract of a cereal flour, for instance, with 97% of paraffin and use that mixture for glazing over fish or other animal product. This type of extract would, of course, be much more expensive than the use of the flours themselves and in view of the fact that the vegetative antioxidants are the cheapest forms of antioxidant materials available, it is considered preferable to use these vegetative materials wherever possible for their protective action. For instance, 25% of a naturally occurring vegetative material such as oat flour may be mixed with 75% of paraffin wax at 200° F. until a thorough infusion of the oat flour in the paraffin takes place thereby transferring the antioxidants from the oat flour into the paraffin wax. This combined paraffin-oat mixture may be used as a glazing over animal products in order to substantially inhibit oxidative changes in those products. Paraffin alone has frequently been used for the purpose of excluding air but oxidative changes will take place due to the natural pro-oxygenic property of the animal products. Oat flour in this instance acts as a definite inhibitor for even though air is excluded by reason of covering the product with paraffin, yet oxidation will still take place unless an inhibitor such as oat flour is present.

Again it should be noted that while oat flour is particularly utilized as an example in connection with the utilization of antioxidant materials, any of the vegetative materials may be utilized and we may particularly mention in addition to oat flour such other products as crushed sesame seed, crushed peanuts, corn germ cake, castor bean pumace, either in and of themselves or in any of the desirable forms such as flours, press cakes, etc., or extracts thereof. While in accordance with this invention the antioxidant materials are desirably employed in their natural condition as vegetative materials as pointed out, extracts may be utilized. These extracts may generally fall into two groups, first the glyceride oil and fat extracts, and second, volatile solvent extracts, including also water extracts. In connection with the glyceride oils and fats, as pointed out in the prior application, the glyceride fats and oils may be employed for removing from vegetative materials much of the antioxidant substances. Direct infusion of the glyceride oils and fats with the vegetative material is desirably employed in this connection, as mixture of the desired oil, for example, with the vegetative material, preferably by heat treatment for from 15 to 20 minutes at a moderate temperature such as 140°–150° F. will produce an infusion of the oil or fat carrying antioxidant substances from the vegetative materials. Such oil or fat extracts may be utilized for coating or treating the substances to be protected against development of rancidity, and particularly the same oils may be utilized in this connection as are present in the material that is to be protected. For example, in the protection of cod livers against development of rancidity, cod liver oil infusions of the vegetative materials carrying the antioxidant substances may be employed. Such glyceride oils infused with the vegetative materials may retain the fibers of the vegetative substances, if desired, or the latter may be removed if the oil containing materials only are to be employed. As has previously been pointed out, the oil and fat infusions carrying the fibers of the vegetative materials are more active in preventing development of oxidative changes than when the fibrous materials are excluded or removed. Or the volatile solvent extracts may be employed. As illustrating volatile solvent extraction, the following may be noted. In general, the alcoholic types of extraction media removed considerably less of the oils present than do the gasoline types of extraction media, when oil-containing vegetative substances are being treated, and this is true even of substances which although not serving as sources for oil commercially, yet contain some oil. An alcoholic extract of whole pulverized oats is substantially free of oat oil, while a gasoline extract may contain the entire 4 to 5% of oat oil present in the oats. The alcoholic extract of soya bean flour is also substantially free of oil. The gasoline type of extract may, if desired, be applied to the press cake left after oil expression or expulsion as, for example, in the soya bean press cake instance. But where the presence of oil is undesirable, the alcoholic extract may be employed. The extracts may be utilized as such, or more desirably the volatile solvent may be distilled out and the residue employed as a concentrate of antioxidant activity. In general such residue obtained, for example, by vacuum distillation and removal of the alcohol leaves a resultant concentrate of somewhat dark color and agreeable odor, but usually neither the color nor odor materially affects the products with which the concentrate is used, particularly since as a general rule the percentages of such concentrates may be very small, as for example from .02 to 1%. As exemplary of such extracts, an ethyl alcohol extract of oat flour could be made by the batch process obtaining 3% of the oat extract during the alcoholic extraction. Thus the concentrate of antioxygenic substances left after the volatile solvent has been removed may be utilized for the dusting and coating operations in accordance with the present invention. I might also mention that other types of antioxidants may be satisfactorily employed for this purpose but I prefer using the vegetative materials because of their availability, cheapness, and degree of acceptability by the Government authorities.

Since the antioxygenic materials present in vegetative substances are present in the non-fatty portions thereof, press cakes obtained from oil extractions or expulsions derived from the oil containing seeds, nuts and fruits may be utilized for the dusting, etc. operations in accordance with the present invention to protect materials against development of rancidity. Two types of press cakes may generally be referred to in this connection. When the ordinary sources of commercial oils are pressed or expelled to recover the oil content, a press cake is left which has little utility at the present time, except in some instances where it is employed for cattle feed. In accordance with the present invention, such press cakes may be pulverized or otherwise handled for the dusting operations or coatings upon the meat, etc. products to protect them against development of rancidity. A different type of press cake is that which results from the processes of the prior specifications referred to herein, wherein oils or fats are directly infused with vegetative material, either of the oil-containing seeds, nuts and fruit type, or of the non-oil containing vegetative materials such as the cereals and grains. When such fibrous materials are removed from the treated oils and fats, these fibrous residues in the form of a press cake, etc. may be pulverized if not already in that condition and utilized for the dusting operations in accordance with the present invention. Even when oils are infused in accordance with the prior specifications, with such vegetative substances, for transference of antioxygenic properties to the oils, a material percentage of antioxygenic substances usually remain in the press cake, and where there is any substantial amount of such material present, such press cakes offer a very cheap form of material for utilization in accordance with the present invention for any of the purposes set forth herein.

It is to be understood that whereas this invention may be applied to such specific meats and fish as have been particularly set forth above, the invention may similarly be applied to the entire field of animal tissues, whether meat or fish and whether those tissues contain a substantial proportion of fat or not. This invention likewise applies to specially processed meat and fish such as to smoked meat, marinated fish, sausages, or any of the animal tissues whether processed or not. This process also applies to such products as may or may not be used for edible purposes as, for instance, cod livers, halibut livers, etc. The cod or halibut livers may be dusted with an antioxidant material such as oat flour immediately as they are removed from the cod or halibut. Rapid deterioration of those tissues takes place unless an inhibitor such as oat flour is present. The oat flour may remain present even during the time that the cod livers or halibut livers are pressed to remove the entrained oil. Following the expression of the cod or halibut livers, oat flour may be dusted upon or mixed with such residue in order to substantially inhibit any fatty degeneration and to keep those livers in sound condition. These livers may be used either for animal food or for manufacture into edible products such as into candy or wafers where the presence of the substances naturally occurring in the livers is considered of value. Candy, for instance, made from cod livers may have admixed with it 10% of oat flour or may be dusted thoroughly with oat flour after manufacture in order to substantially inhibit the development of the characteristic fishiness which occurs very rapidly after the death of any fish. The characteristic fishiness may be substantially inhibited in the manner above described by the use of an antioxidant material such as oat flour immediately as the fish is caught. It is furthermore understood that although specific percentages have been given herein in the use of antioxidants, it is understood that a greater activity is obtained by the use of a larger percentage of the antioxidants and also that the percentage of the antioxidant used will depend to a considerable extent upon its activity with the food processed. Therefore, the percentage, just as the type of antioxidant, may vary considerably dependent upon the protection desired and the condition of the animal product to be protected. Such other products which contain only in part animal products such as canned chicken broth, cracker fillings containing from 5% to 10% of skim milk powder, etc. should contain relatively small percentages of these antioxygenic materials in order to offset the prooxygenic activity of the animal products.

It is to be understood that since the nature of the protective action referred to herein is to a considerable extent beyond human understanding, it is very likely that the oat flour may possess protective action other than inhibiting fatty oxidation alone. Particularly in the case of the storage of fresh fish is it noted that when dusted with whole pulverized oats there is a noticeable decrease in the characteristic putrefaction as against fish which was not dusted. It may very well be, therefore, that whole pulverized oats possess the property of inhibiting protein decomposition or bacterial activity just as it is effective in inhibiting fatty degeneration. This application is, therefore, directed to the use of oat flour as a general inhibitor rather than, strictly speaking, as an antioxidant since its field of application should not be limited entirely to antioxidant activity but appears to be more general in its effectiveness as an inhibitor. Inhibiting of this type may take place with respect to polymerization, bacterial action, protein decomposition, etc., as well as fatty degeneration. The results achieved by the use of oat flour indicate the protective action but do not indicate specifically how this protective action is brought about.

Having thus set forth my invention, I claim:

1. A method of protecting an animal product subject to oxidative change against deterioration which comprises the dusting of a mixture of 50% salt and 50% of a vegetative antioxidative substance including cereal flour upon the surface of such animal product.

2. A method of protecting bacon against rancidity which comprises dusting its surface with .5% of a vegetative antioxidative substance including a vegetative flour.

3. A method of protecting cured meat products against fatty oxidation which comprises applying a surface coating of a vegetative antioxidative substance to a cured meat product.

4. An animal tissue subject to oxidative change, said tissue carrying a surface coating of a vegetative antioxidative substance.

5. An animal tissue subject to oxidative change, said tissue carrying a dust of vegetative antioxidative substance on the surfaces thereof.

6. An animal tissue comprising bacon subject to oxidative change, said bacon carrying a surface coating of a vegetative antioxidative substance.

7. An animal tissue comprising a cured meat subject to oxidative change, said cured meat carrying a surface coating of a vegetative antioxidative substance.

8. An animal tissue comprising a fish product subject to oxidative change, said fish product carrying a surface coating of a vegetative antioxidative substance.

9. The method of protecting animal tissues against undesired oxidative change, which comprises applying a surface coating of a vegetative antioxidative substance to said animal tissue.

10. The method of protecting an animal tissue against undesired oxidative change, which comprises dusting said animal tissue with a vegetative antioxidative material.

SIDNEY MUSHER.